(12) United States Patent
Suzuki et al.

(10) Patent No.: US 7,532,606 B2
(45) Date of Patent: *May 12, 2009

(54) DTMF SIGNAL TRANSMISSION METHOD AND COMMUNICATION APPARATUS

(75) Inventors: Shinya Suzuki, Koriyama (JP);
Kimitoshi Takeuchi, Koriyama (JP);
Toru Yoshihara, Koriyama (JP);
Makoto Oohashi, Koriyama (JP)

(73) Assignee: Hitachi Telecom Technologies, Ltd, Koriyama-shi (JP)

( * ) Notice: Subject to any disclaimer, the term of this patent is extended or adjusted under 35 U.S.C. 154(b) by 966 days.

This patent is subject to a terminal disclaimer.

(21) Appl. No.: 10/782,937

(22) Filed: Feb. 23, 2004

(65) Prior Publication Data

US 2004/0160965 A1 Aug. 19, 2004

Related U.S. Application Data

(62) Division of application No. 09/395,778, filed on Sep. 14, 1999, now Pat. No. 6,700,973.

(30) Foreign Application Priority Data

Sep. 25, 1998 (JP) ............................... 10-272271
Aug. 26, 1999 (JP) ............................... 11-240524

(51) Int. Cl.
*H04W 4/00* (2006.01)
*H04L 12/66* (2006.01)
*H04L 12/28* (2006.01)
*H04L 12/56* (2006.01)
*H04M 3/00* (2006.01)
*H04M 5/00* (2006.01)

(52) U.S. Cl. ............... 370/338; 370/352; 370/395.64; 379/283

(58) Field of Classification Search ............ 370/474, 370/395, 280, 426, 463, 466, 524, 523, 352, 370/353, 526, 345, 354, 338, 356, 401, 349, 370/468, 359, 328, 230, 235, 253, 395.64; 379/386, 88.27, 211, 283, 93.08, 42, 88, 379/93, 351, 212, 89, 159, 167; 455/445, 455/433, 560, 426, 401, 572, 422, 453, 434, 455/161, 414; 704/230, 208, 265; 375/219, 375/240; 709/223, 227

See application file for complete search history.

(56) References Cited

U.S. PATENT DOCUMENTS 4,189,625 A * 2/1980 Strandberg ................ 375/240

(Continued)

FOREIGN PATENT DOCUMENTS

JP 62-125726 A 6/1987

(Continued)

*Primary Examiner*—Wing F Chan
*Assistant Examiner*—Prenell P Jones
(74) *Attorney, Agent, or Firm*—Foley & Lardner LLP

(57) ABSTRACT

A communication apparatus connected to a PBX and an ATM network is provided with a DTMF signal detecting portion for detecting whether or not a DTMF signal is contained in a voice signal from the PBX, a DTMF signal monitoring portion, a DTMF cell generating portion for coding and sending out a DTMF signal, a DTMF cell decomposing portion for decoding a coded DTMF signal and a DTMF signal generating portion for generating a DTMF signal on the basis of the information content of a decoded DTMF signal and sending out this DTMF signal to the PBX, and the transmission side communication apparatus codes a DTMF signal in a specified form and transmits the DTMF signal and the reception side communication apparatus decodes the coded DTMF signal and, on the basis of this content information, restores the DTMF signal in a DTMF signal generating portion. By doing so, even in case of transmitting a DTMF signal by way of a communication apparatus performing a voice code compression, it is made possible for a reception side communication apparatus (PBX) to judge/recognize the DTMF signal without error.

8 Claims, 8 Drawing Sheets

U.S. PATENT DOCUMENTS

| | | | | |
|---|---|---|---|---|
| 4,219,699 A | * | 8/1980 | Nilssen et al. | 379/204.01 |
| 5,010,569 A | * | 4/1991 | Katagawa | 379/211.01 |
| 5,172,406 A | * | 12/1992 | Locke | 379/88.27 |
| 5,333,191 A | * | 7/1994 | McCarthy | 379/386 |
| 5,633,862 A | * | 5/1997 | Suzuki et al. | 370/280 |
| 5,666,357 A | * | 9/1997 | Jangi | 370/345 |
| 5,781,593 A | * | 7/1998 | Petch et al. | 375/354 |
| 5,796,729 A | * | 8/1998 | Greaney et al. | 370/345 |
| 5,889,851 A | * | 3/1999 | Hsieh | 379/351 |
| 5,926,477 A | * | 7/1999 | Shirokura et al. | 370/395.61 |
| 5,982,783 A | * | 11/1999 | Frey et al. | 370/395.6 |
| 6,021,135 A | * | 2/2000 | Ishihara et al. | 370/474 |
| 6,023,474 A | | 2/2000 | Gardner et al. | |
| 6,122,353 A | * | 9/2000 | Brady et al. | 379/142.08 |
| 6,125,117 A | * | 9/2000 | Martin et al. | 370/397 |
| 6,262,992 B1 | * | 7/2001 | Nelson et al. | 370/426 |
| 6,411,808 B1 | * | 6/2002 | Adachi et al. | 455/434 |
| 6,650,662 B1 | * | 11/2003 | Arnaud et al. | 370/526 |
| 7,050,570 B2 | * | 5/2006 | Suzuki et al. | 379/386 |

FOREIGN PATENT DOCUMENTS

| | | |
|---|---|---|
| JP | 4-354495 A | 12/1992 |
| JP | 08-172480 | 7/1996 |
| JP | 10-13362 A | 1/1998 |

\* cited by examiner

FIG. 3

AAL2 CELL FORMAT

| OCTET NO. | CELL STRUCTURE | | | | | | | | |
|---|---|---|---|---|---|---|---|---|---|
| | 8 | 7 | 6 | 5 | 4 | 3 | 2 | 1 | |
| 1 | GFC | | | | VPI | | | | ⎫ |
| 2 | VPI | | | | VCI | | | | |
| 3 | VCI | | | | | | | | F301 |
| 4 | VCI | | | | PT | | | CLP | |
| 5 | HEC | | | | | | | | ⎭ |
| 6 | OSF | | | | | | SN | P | }F302 |
| 7 | CPS-PDU PAYLOAD (CPS FRAME PORTION) | | | | | | | | ⎫ |
| 8 | | | | | | | | | |
| ⋮ | | | | | | | | | F303 |
| 52 | | | | | | | | | |
| 53 | | | | | | | | | ⎭ |

FIG. 4

(a) CPS-PDU PAYLOAD FORMAT FOR A VOICE CELL

| | OCTET NO. | CELL STRUCTURE | | | | | | | |
|---|---|---|---|---|---|---|---|---|---|
| | | 8 | 7 | 6 | 5 | 4 | 3 | 2 | 1 |
| F401 — CPS-PH | 7 | VF | | CID | | | | | |
| | 8 | LI | | | | | | (0) | SN |
| | 9 | SN | | | HEC | | | | |
| F402 — CPS-PP | 10 | VOICE CODE INFORMATION | | | | | | | |
| | 11 | | | | | | | | |
| | 12 | | | | | | | | |
| | 13 | | | | | | | | |
| | 14 | | | | | | | | |
| | ⋮ | | | | | | | | |
| | 52 | | | | | | | | |
| | 53 | | | | | | | | |

(b) CPS-PDU PAYLOAD FORMAT FOR DTMF

| | OCTET NO. | CELL STRUCTURE | | | | | | | |
|---|---|---|---|---|---|---|---|---|---|
| | | 8 | 7 | 6 | 5 | 4 | 3 | 2 | 1 |
| F403 — CPS-PH | 7 | VF | | CID | | | | | |
| | 8 | LI | | | | | | (0) | SN |
| | 9 | SN | | | HEC | | | | |
| F404 — CPS-PP | 10 | SS/SR | | | | | | | |
| | 11 | DTMF TIME | | | | | | | DV |
| | 12 | DTMF CODE | | | | | | | |
| | 13 | $(00)_{16}$ | | | | | | | |
| | 14 | | | | | | | | |
| | ⋮ | | | | | | | | |
| | 52 | | | | | | | | |
| | 53 | $(00)_{16}$ | | | | | | | |

DTMF SIGNAL TRANSMISSION METHOD AND COMMUNICATION APPARATUS

The present application is a divisional of U.S. application Ser. No. 09/395,778, filed Sep. 14, 1999, the entire contents of which are incorporated herein by reference.

CROSS-REFERENCES TO RELATED APPLICATION

This application claims all benefits accruing under 35 U.S.C§119 from the Japanese Patent Application No. 10-272271, filed Sep. 25, 1998 and the Japanese Patent Application No. 11-240524, filed Aug. 26, 1999.

BACKGROUND OF THE INVENTION

1. Field of the Invention

The present invention relates to a communication system which voice-code-compresses and transmits a voice signal from a voice terminal apparatus of a telephone terminal apparatus or a private branch exchange (hereinafter referred to as PBX) or the like, and particularly to a DTMF signal transmission method and communication apparatus for accurately transmitting a dual tone multi-frequency (hereinafter referred to as DTMF) signal including a push button (hereinafter referred to as PB) signal.

2. Description of the Related Art

Up to now, a communication system which voice-code-compresses and transmits a voice signal to the opposite side by means of a communication apparatus such as a multiplexer and the like has also voice-code-compressed and transmitted a DTMF signal such as a PB signal and the like sent from a telephone terminal apparatus as well as an ordinary voice signal to the opposite communication apparatus. That is to say, a communication apparatus at the transmission side voice-code-compresses and transmits as an ordinary voice signal a DTMF signal without paying a particular attention, and on the other hand, a communication apparatus at the reception side voice-code-expands and restores the received voice-code-compressed signal to a voice signal (DTMF signal) and sends it to a voice terminal apparatus of a PBX or the like, and the voice terminal apparatus judges and recognizes the code of the DTMF signal and performs a specified operation.

Like the above-mentioned prior art, however, in case of compressing and expanding a DTMF signal as one of voice signals, there has been a problem that a DTMF signal (voice signal) expanded by a communication apparatus at the reception side is out of a reception rule and is sometimes not recognized as a DTMF signal by a voice terminal apparatus side of a PBX and the like.

And in case of transmitting a DTMF signal, there has been a problem that since a communication apparatus side which has received a DTMF signal needs a judgement time for judging the DTMF signal and the DTMF signal is transmitted to the opposite voice terminal apparatus as a voice signal during the judgement time, a DTMF signal restoring side obtains a DTMF sound by expanding a voice-code-compressed DTMF signal and then restores a DTMF signal obtained by decoding a DTMF signal and thus the DTMF sound obtained by expanding a voice-code-compressed signal sometimes comes to be out of a reception rule for a DTMF signal and sometimes is not recognized as a DTMF signal by a voice terminal apparatus side of a PBX or the like.

An object of the invention is to provide a DTMF signal transmission method and communication apparatus capable of judging/recognizing a DTMF signal without error by means of a communication apparatus at the reception side (voice terminal apparatus) even in case of transmitting the DTMF signal by means of a communication apparatus for performing a voice code compression.

BRIEF SUMMARY OF THE INVENTION

The present invention is characterized by a communication apparatus connected to a voice terminal apparatus and a communication channel, said communication apparatus comprising;

a voice code compressing means for generating voice information by code-compressing a voice signal from said voice terminal apparatus and sending out this voice information to said communication channel, a voice code expanding means for generating a voice signal by code-expanding compressed voice information from said communication channel and sending out this voice signal to said voice terminal apparatus, a detecting means for detecting whether or not a DTMF signal is contained in a voice signal from said voice terminal apparatus, a DTMF coding means for, when said detecting means has detected a DTMF signal, generating DTMF information by coding the said DTMF signal into a specified form and sending out this information to said communication channel, a DTMF decoding means for decoding coded DTMF information from said communication channel, and a DTMF generating means for generating a DTMF signal on the basis of the content decoded by said DTMF decoding means and sending out this DTMF signal to said voice terminal apparatus.

And the present invention is characterized by a communication system comprising a transmission side voice terminal apparatus, a transmission side communication apparatus for connecting said transmission side voice terminal apparatus, a reception side voice terminal apparatus and a reception side communication apparatus for connecting said reception side voice terminal apparatus in which communication system said transmission side communication apparatus and said reception side communication apparatus are connected through a communication channel to each other, wherein;

said transmission side communication apparatus is provided with;

a voice code compressing means for generating voice information by code-compressing a voice signal from said transmission side voice terminal apparatus and sending out this voice information to said communication channel, a detecting means for detecting whether or not a DTMF signal is contained in a voice signal from said transmission side voice terminal apparatus, and a DTMF coding means for, when said detecting means has detected a DTMF signal, generating DTMF information by coding the said DTMF signal into a specified form and sending out this DTMF information to said communication channel, and said reception side communication apparatus is provided with;

a voice code expanding means for generating a voice signal by code-expanding compressed voice information from said communication channel and sending out this voice signal to said reception side voice terminal apparatus, a DTMF decoding means for decoding coded DTMF information from said communication channel, and a DTMF generating means for generating a DTMF signal on the basis of the content decoded by said DTMF decoding means and sending out this DTMF signal to said reception side voice terminal apparatus.

BRIEF DESCRIPTION OF THE SEVERAL VIEWS OF THE DRAWINGS

FIG. 3 is a diagram showing the basic composition of an ATM cell AAL2 format.

FIG. 4 is a diagram showing the basic composition of a common path sub-layer protocol data unit payload portion shown in FIG. 3.

DETAILED DESCRIPTION OF THE INVENTION

Embodiments of the present invention are described in detail with reference to the drawings in the following.

Figure 1:
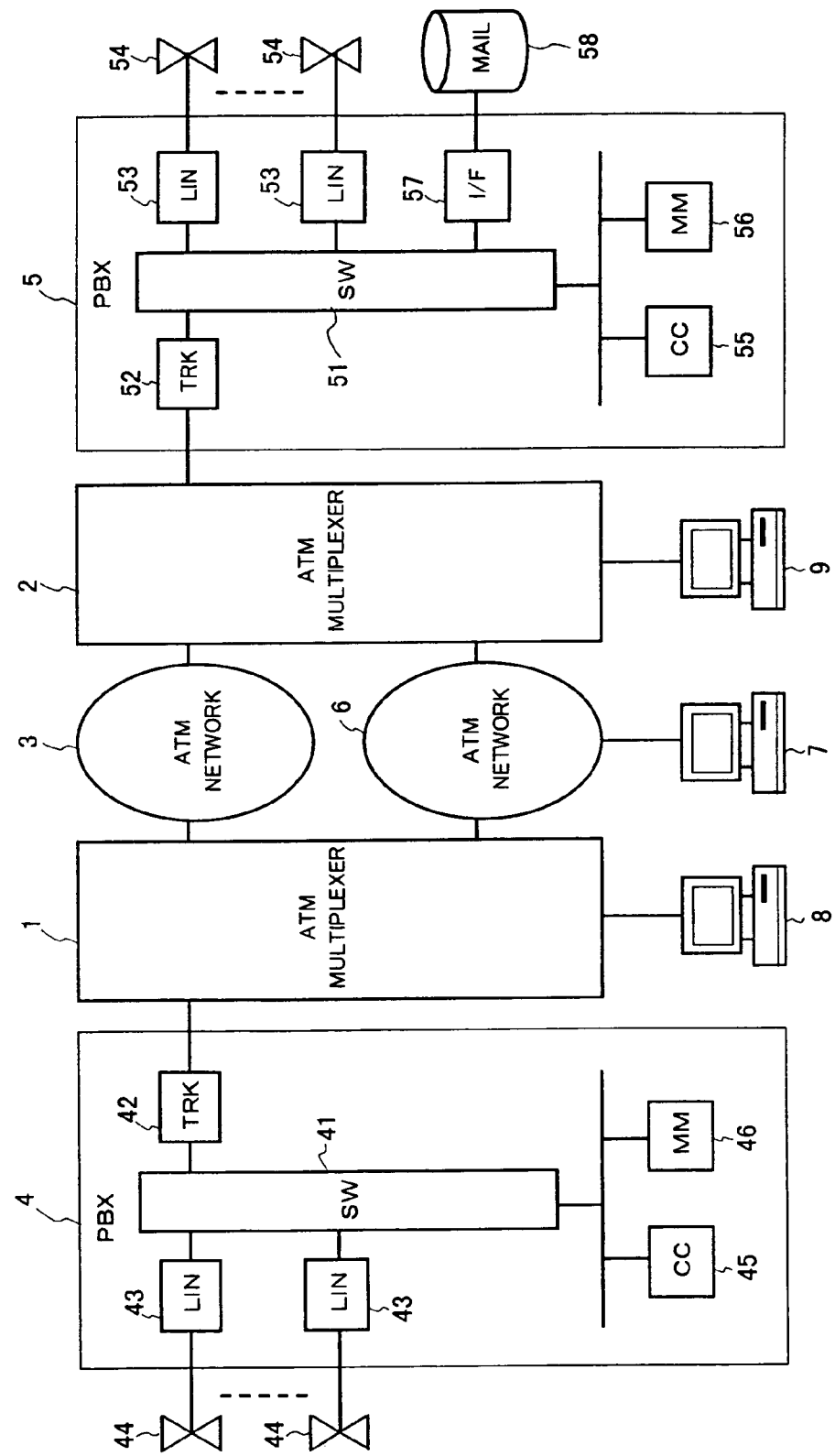
FIG. 1 is a system configuration diagram showing the whole configuration of a system of the present invention.

FIG. 1 is a system configuration diagram showing the whole configuration of a system of the present invention. In FIG. 1, the system comprises an ATM multiplexer 1 at one side, an ATM multiplexer 2 at the other side, an ATM network 3 for connecting the ATM multiplexers 1 and 2, a PBX 4 connected to the ATM multiplexer 1, a PBX 5 connected to the ATM multiplexer 2, a plurality of extension telephones 44 accommodated in the PBX 4, a plurality of extension telephones 54 accommodated in the PBX 5, an electronic mail apparatus 58 accommodated in the PBX 5, a public network 6 for connecting the ATM multiplexers 1 and 2, a centralized management terminal apparatus 7 connected to the public network 6, a management terminal apparatus 8 connected to the ATM multiplexer 1, and a management terminal apparatus 9 connected to the ATM multiplexer 2.

The ATM multiplexer 1 voice-code-compresses a series of voice signals from the PBX 4 and then makes them into an ATM cell and transmits it to the ATM network 3, and decells (decomposes) the ATM cell received from the ATM network 3 and then voice-code-expands and restores the decelled ATM cell to a series of voice signals and transmits them to the PBX 5. And in the same way, the ATM multiplexer 2 voice-code-compresses a series of voice signals from the PBX 5 and then makes them into an ATM cell and transmits it to the ATM network 3, and decells (decomposes) the ATM cell received from the ATM network 3 and then voice-code-expands and restores the decelled ATM cell to a series of voice signals and transmits them to the PBX 4.

The PBX 4 freely performs switching and connecting operations between the extension telephones 44 or between the extension telephones 44 and the ATM multiplexer 1, and similarly the PBX 5 freely performs switching and connecting operations between the extension telephones 54, between the extension telephones 54 and the ATM multiplexer 2, between the extension telephones 54 and the electronic mail apparatus 58, or between the ATM multiplexer 2 and the electronic mail apparatus 58.

Describing them in more detail, the PBX 4 is provided with a speech path switch (SW) 41, an extension circuit (LIN) 43 connected to the speech path switch 41, a trunk circuit (TRK) 42 connected to the speech path switch 41, a central control unit (CC) 45, and a main memory (MM) 46.

The speech path switch 41 freely connects to each other and establishes a speech path between the extension circuits 43 or between the extension circuits 43 and the trunk circuit 42, the extension circuit 43 has an interface function for controlling connection between the extension telephones 44, and the trunk circuit 42 has an interface function for controlling connection with the ATM multiplexer 1. Moreover, the central control unit 45 controls the whole PBX 4 including the speech path switch 41, the extension circuits 43 and the trunk circuit 42, and the main memory 46 stores station data, tables, processing programs and the like required for the central control unit 45 to control the whole PBX 4.

The PBX 5 is provided with a speech path switch (SW) 51, an extension circuit (LIN) 53 connected to the speech path switch 51, a trunk circuit (TRK) 52 connected to the speech path switch 51, a mail interface circuit (I/F) 57 connected to the speech path switch 51, a central control unit (CC) 55, and a main memory (MM) 56.

The speech path switch 51 freely connects to each other and establishes a speech path between the extension circuits 53, between the extension circuits 43 and the trunk circuit 52, between the extension circuits 53 and the mail interface circuit 57 or between the trunk circuit 52 and the mail interface circuit 57. The extension circuit 53 has an interface function for controlling connection between the extension telephones 54, and the trunk circuit 52 has an interface function for controlling connection with the ATM multiplexer 2, and the mail interface circuit 57 has an interface function for controlling connection with the electronic mail apparatus. Moreover, the central control unit 55 controls the whole PBX 5 including the speech path switch 51, the extension circuits 53, the trunk circuit 52 and the mail interface circuit 57, and the main memory 56 stores station data, tables, processing programs and the like required for the central control unit 55 to control the whole PBX 5.

And in such a composition as this, the ATM multiplexer 1 and the ATM multiplexer 2 perform an ATM communication between them through the ATM network 3.

Therefore, between the extension telephones 44 and the extension telephones 54 or between the extension telephones 44 and the electronic mail apparatus 58 a communication connection of a voice signal (speech connection) can be performed through the PBX 4, the ATM multiplexer 1, the ATM network 3, the ATM multiplexer 2 and the PBX 5.

And the centralized management terminal apparatus 7, which manages centrally the ATM multiplexers 1 and 2 at a remote site, is connected to the ATM multiplexers 1 and 2 through the public network 6, sets various kinds of setting information necessary for operation of the ATM multiplexers 1 and 2, and monitors a communication status (failure information) of the ATM multiplexers 1 and 2.

Furthermore, the management terminal apparatus 8, which manages the ATM multiplexer 1, sets various kinds of setting information necessary for operation of the ATM multiplexer 1 and monitors a communication status (failure information) of the ATM multiplexer 1, and in the same way, the management terminal apparatus 9, which manages the ATM multiplexer 2, sets various kinds of setting information necessary for operation of the ATM multiplexer 2 and monitors a communication status (failure information) of the ATM multiplexer 2.

Figure 2:
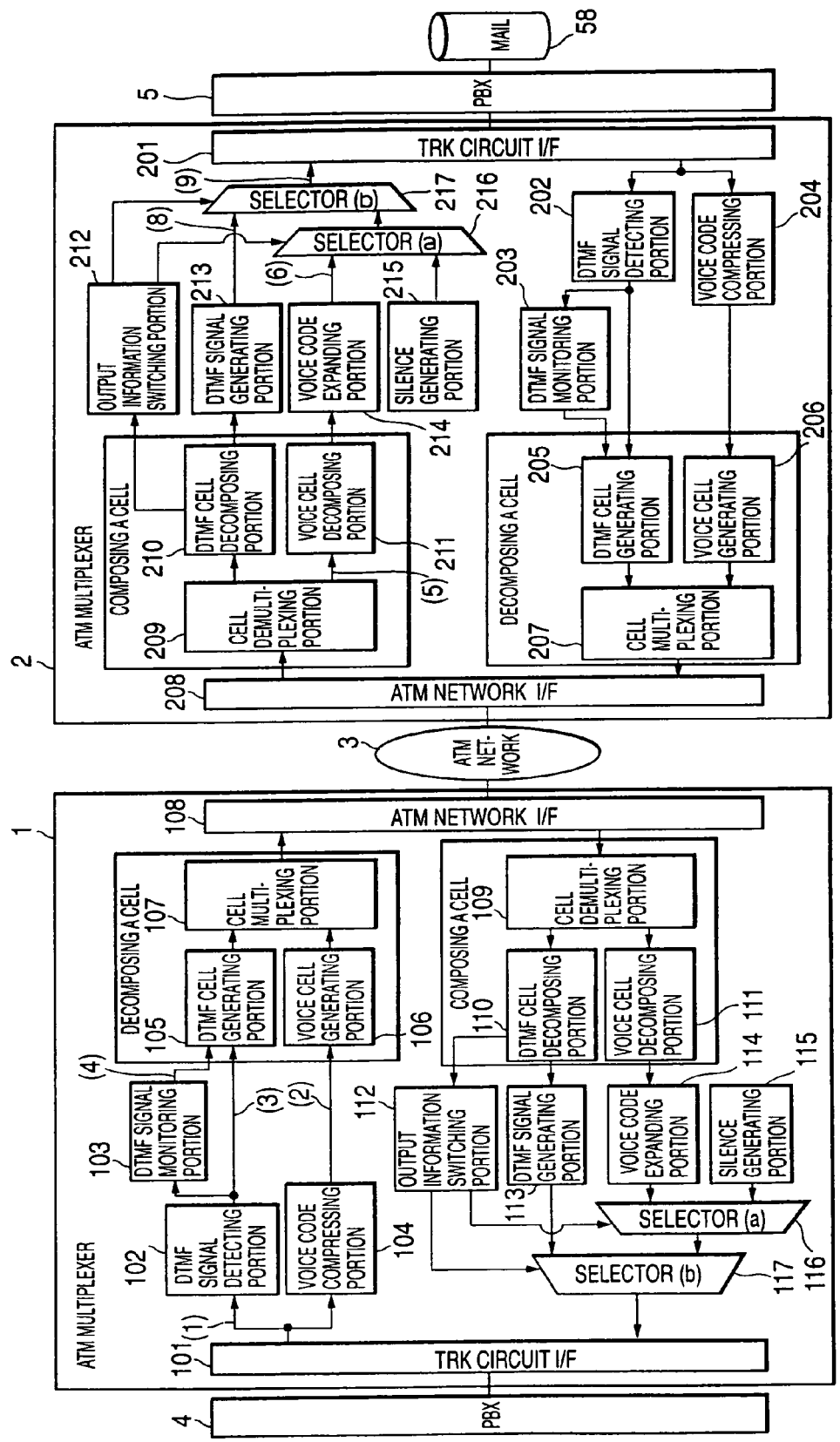
FIG. 2 is a block diagram showing the internal configuration of an ATM multiplexer according to an embodiment of the present invention.

FIG. 2 is a block diagram showing the internal composition of an ATM multiplexer according to an embodiment of the present invention.

In FIG. 2, the ATM multiplexers 1 and 2 have the same composition as each other, and the ATM multiplexers 1 and 2 are respectively composed of trunk circuit interface portions 101 and 201, DTMF signal detecting portions 102 and 202, DTMF signal monitoring portions 103 and 203, voice code compressing portions 104 and 204, DTMF cell generating portions 105 and 205, voice cell generating portions 106 and 206, cell multiplexing portions 107 and 207, ATM network interface portions 108 and 208, cell demultiplexing portions 109 and 209, DTMF cell decomposing portions 110 and 210, voice cell decomposing portions 111 and 211, output information switching portions 112 and 212, DTMF signal generating portions 113 and 213, voice code expanding portions 114 and 214, silence generating portions 115 and 215, selectors (a) 116 and 216, and selectors (b) 117 and 217.

The trunk circuit interface portion 101 or 201, which is an interface portion for communication-connecting the PBX 4 or 5 (trunk circuit 42 or 52) with a voice signal, sends out a voice signal from the PBX 4 or 5 to the DTMF signal detecting portion 102 or 202 and the voice code compressing portion 104 or 204, and sends out a voice signal from the selector (b) 117 or 217 to the PBX 4 or 5.

The DTMF signal detecting portion 102 or 202 detects whether or not a DTMF signal is contained in a voice signal obtained from the trunk circuit interface portion 101 or 201, sends out the detection result as a first DTMF detection signal to the DTMF signal monitoring portion 103 or 203 and the DTMF cell generating portion 105 or 205, and keeps the first DTMF detection signal in an ON state when a DTMF signal is detected, and keeps the first DTMF detection signal in an OFF state when a DTMF signal is not detected.

The DTMF signal monitoring portion 103 or 203 receives a DTMF signal coming through the DTMF signal detecting portion 102 or 202 and a first DTMF detection signal obtained from the DTMF signal detecting portion 102 or 202. And it samples the obtained first DTMF detection signal and measures a time from the directly previous signal change point (when the signal has changed from an ON state to an OFF state, or when the signal has changed from an OFF state to an ON state) to the next (new) signal change point, and sends out this time as signal change detection time information to the DTMF cell generating portion 105 or 205.

And the DTMF signal monitoring portion 103 or 203 always detects and analyzes a DTMF signal, and sends out the detection result and the analysis result to the DTMF cell generating portion 105 or 205. Namely, it sends out the detection content of a DTMF signal as a second DTMF detection signal to the DTMF cell generating portion 105 or 205, and keeps the second DTMF detection signal in an ON state when a DTMF signal is detected, and keeps the second DTMF detection signal in an OFF state and notifies the DTMF cell generating portion 105 or 205 of value information of the DTMF signal (DTMF code information) as the analysis result of the DTMF signal when a DTMF signal is not detected.

The DTMF signal monitoring portion 103 or 203 has a function of notifying the DTMF cell generating portion 105 or 205 of DTMF signal status information showing a state where a DTMF signal is periodically detected at intervals of a predetermined period of time (for example, intervals of one second) or a state where it is not detected.

The DTMF cell generating portion 105 or 205, which generates an ATM cell on the basis of a first DTMF detection signal obtained from the DTMF signal detecting portion 102 or 202, signal change detection time information obtained from the DTMF signal monitoring portion 103 or 203, a second DTMF detection signal and value information of a DTMF signal (DTMF code information), sends out an ATM cell containing identification information representing a DTMF cell and content information of a DTMF signal as information for sending out an original DTMF signal. A detailed composition of the format of an ATM cell for transmission of a DTMF signal (hereinafter referred to as a DTMF cell) is described later.

The voice code compressing portion 104 or 204 voice-code-compresses a voice signal obtained from the trunk circuit interface portion 101 or 201 according to a specific rule and algorithm and sends out it to the voice cell generating portion 106 or 206.

The voice cell generating portion 106 or 206, which receives a voice-code-compressed voice signal from the voice code compressing portion 104 or 204 and generates an ATM cell on the basis of this, sends out as voice information an ATM cell containing identification information representing a voice cell and content information of a voice-code-compressed voice signal. A detailed composition of the format of an ATM cell for transmission of a voice signal (hereinafter referred to as a voice cell) is described later.

The cell multiplexing portion 107 or 207 multiplexes ATM cells from the DTMF cell generating portion 105 or 205 and the voice cell generating portion 106 or 206 in order of occurrence, and sends out them to the ATM network interface portion 108 or 208.

The ATM network interface portion 108 or 208 makes a physical, electrical and logical matching state with the ATM network 3, sends out an ATM cell received from the cell multiplexing portion 107 or 207 to the ATM network 3 and transmits the ATM cell to the ATM multiplexer 1 or 2 as the opposite apparatus, and sends out an ATM cell received through the ATM network 3 from the ATM multiplexer 1 or 2 as the opposite apparatus to the cell demultiplexing portion 109 or 209.

The cell demultiplexing portion 109 or 209 recognizes and classifies an ATM cell received from the ATM network interface portion 108 or 208 according to its cell class, and sends out the ATM cell to the DTMF cell decomposing portion 110 or 210 in case that the ATM cell is a DTMF cell, and sends out the ATM cell to the voice cell decomposing portion 111 or 211 in case that the ATM cell is a voice cell.

The DTMF cell decomposing portion 110 or 210, when it receives a DTMF cell, performs an ATM header process including recognition whether or not the DTMF cell is directed to its own apparatus and a cell-loss judgement (error detection), and a CPS-PH process including a channel identification and a sequence number judgement (error detection), and then recognizes/analyzes the content information of a DTMF signal contained in the received DTMF cell and notifies the DTMF signal generating portion 113 or 213 of the signal change detection time of the DTMF signal and value information of the DTMF signal (DTMF code information) and notifies the output information switching portion 112 or 212 of a selector control signal for controlling the selector (a) 116 or 216 and the selector (b) 117 or 217.

The voice cell decomposing portion 111 or 211, when it receives a voice cell, performs an ATM header process and a CPS-PH process in the same way as the DTMF cell decomposing portion 110 or 210, and then extracts a voice-codecompressed voice signal and sends out this signal to the voice code expanding portion 114 or 214.

The output information switching portion 112 or 212 controls outputs of the selector (a) 116 or 216 and the selector (b) 117 or 217 according to a selector control signal received from the DTMF signal decomposing portion 110 or 210, and switches over the content of a voice signal to be outputted through the trunk circuit interface portion 101 or 201 to the PBX 4 or 5.

The DTMF signal generating portion 113 or 213 receives signal change detection time information and DTMF value information (DTMF code information) from the DTMF cell decomposing portion 110 or 210, generates a DTMF signal corresponding to the DTMF value information (DTMF code information), and sends out this DTMF signal to the selector (b) 117 or 217 during the same time as a time notified as signal change detection time information.

The voice code expanding portion 114 or 214 voice-code-expands a voice-code-compressed voice signal received from the voice cell decomposing portion 111 or 211 and sends out the voice signal to the selector (a) 116 or 216.

The silence generating portion 115 or 215 always generates and sends out a silence signal to the selector (a) 116 or 216. The silence signal is a signal with which a human being can feel a silent state without uncomfortableness when it listens to a voice, and generally uses a low-level noise signal.

The selector (a) 116 or 216 sends out to the selector (b) 117 or 217 either one of a voice signal from the voice code expanding portion 114 or 214 and a silence signal from the silence generating portion 115 or 215 according to control from the output information switching portion 112 or 212.

And the selector (b) 117 or 217 sends out to the trunk circuit interface portion 101 or 201 either one of a DTMF signal from the DTMF signal generating portion 113 or 213 and a voice signal or a silence signal from the selector (a) 116 or 216.

Next, the format composition of an ATM cell used in the present invention is described.

FIG. 3 is a diagram showing the basic composition of an ATM adoption layer 2 (AAL2) cell format. In FIG. 3, an AAL2 cell is composed of an ATM header portion F301 of 5 bytes, a start field (STF) portion F302 of 1 byte, and a common path sub-layer protocol data unit payload (CPS-PDU Payload) portion F303 of 47 bytes for storing concrete content information of a voice signal or a DTMF signal to be transferred.

The ATM header portion F301 is composed of a GFC domain of 4 bits, a VPI domain of 8 bits, a VCI domain of 16 bits, a PT domain of 3 bits, a CLP domain of 1 bit and an HEC domain of 8 bits, as prescribed in ITU-T Recommendations I.361 "Broad-band ISDN ATM Layer Specifications".

And the STF portion F302 is composed of an OSF domain of 6 bits for specifying the storing location of a common path sub-layer protocol data unit portion, an SN domain of 1 bit for storing a sequence number and a P domain of 1 bit for storing a parity bit. The composition of the common path sub-layer protocol data unit payload portion F303 of FIG. 3 is described with reference to FIG. 4.

FIG. 4 is a diagram showing the format composition of the common path sub-layer protocol data unit payload portion F303 shown in FIG. 3. In FIG. 4, symbol (a) is a diagram showing the format composition of the CPS-PDU Payload portion for a voice cell used when transmitting a voice and a voice signal such as a facsimile signal or the like, and (b) is a diagram showing the format composition of the CPS-PDU Payload portion for a DTMF cell used when transmitting a DTMF signal and a DTMF signal containing an SS/SR signal.

In FIG. 4(a), the CPS-PDU Payload portion for a voice signal is almost in conformity to ITU-T Recommendations I.363.2 "B-ISDN ATM Adoption Layer Type 2", and is composed of a common path sub-layer packet header (CPS-PH) portion F401 and a common path sub-layer packet payload (CPS-PP) portion F402.

The CPS-PH portion F401 represents a cell class, and is composed of a cell identification (VF) domain of 2 bits for storing an identifier "00" when the content of a voice signal to be transmitted is an ordinary voice signal and storing an identifier "10" when the content of a voice signal is a facsimile signal, a channel identification (CID) domain of 6 bits for storing a channel identifier, a length indicator (LI) domain of 6 bits for storing information representing a range of effective information, a sequence number (SN) domain of 4 bits for storing frame number information of a voice signal and a header error control (HEC) domain of 5 bits for storing error control information, and the common path sub-layer packet payload portion F402 is composed as a voice code information storing domain for storing a voice-code-compressed voice signal. A voice cell containing the CPS-PDU Payload portion for a voice cell is generated by the voice cell generating portion 106 or 206 shown in FIG. 2.

In FIG. 4(b), the CPS-PDU Payload portion for a DTMF cell is composed of a CPS-PH portion F403 and a CPS-PP portion F404 similarly to FIG. 4(a).

The CPS-PH portion F403 has the same composition as the CPS-PH portion F401 of FIG. 4(a), but in case that the CPS-PDU Payload portion is a portion used for a DTMF cell, an identifier "11" is stored in the VF domain, said identifier showing that this ATM cell is a DTMF cell and information related to a DTMF voice signal or information of an SS/SR signal is stored in the CPS-PP portion F404. And the CPS-PP portion F404 is composed of an SS/SR domain for storing an SS/SR control signal, a signal change detection time (DTMF TIME) domain for storing the signal change detection time measured by the DTMF signal monitoring portion 103 or 203, a DTMF signal existence (DV) domain for storing a DTMF signal existence signal, and a DTMF code (DTMF CODE) domain for storing DTMF value information (DTMF code information). A DTMF cell containing the CPS-PDU Payload portion for a DTMF cell is generated by the DTMF cell generating portion 105 or 205 shown in FIG. 2.

Figure 5:
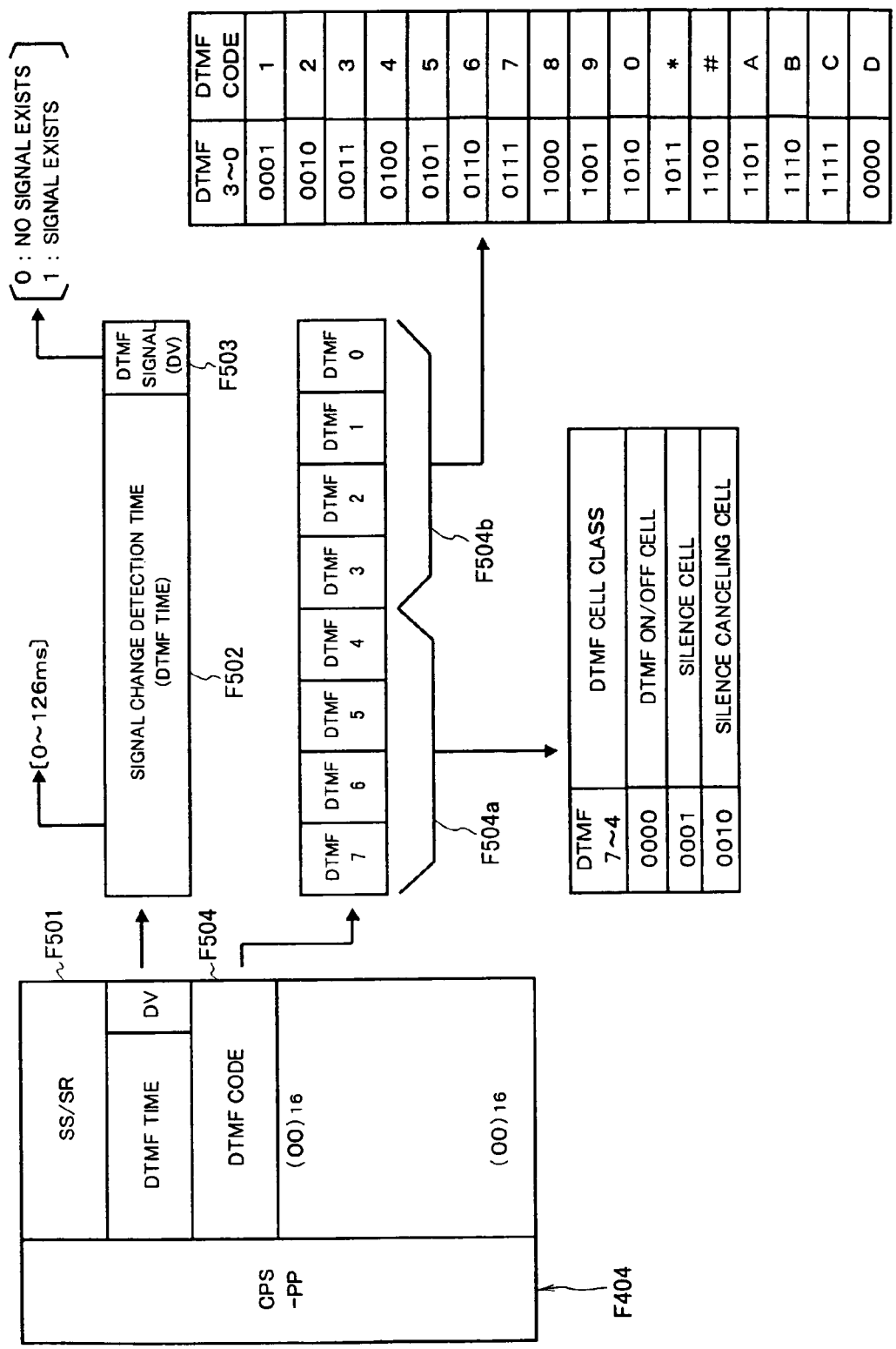
FIG. 5 is a diagram showing a concrete composition of a common path sub-layer packet payload portion for a DTMF cell.

FIG. 5 is a diagram showing a concrete composition of the CPS-PP portion F404 in the CPS-PDU Payload for a DTMF cell shown in FIG. 4(b).

In FIG. 5, an SS/SR domain F501 is an SS/SR domain for storing an SS/SR control signal which is a communication control signal used by the trunk circuit. A DTMF TIME domain F502 is a domain for storing a signal change detection time measured by the DTMF signal monitoring portion 103 or 203 as described above, and stores time information from 0 to 126 ms. A DV domain F503 is a domain for storing a DTMF signal existence signal as described above, and stores "0" when there is not a DTMF signal and stores "1" when there is a DTMF signal.

And a DTMF CODE domain F504 uses its upper 4 bits as a DTMF cell class domain F504a used for notification of the class information of a DTMF cell and uses its lower 4 bits as a DTMF code domain F504b used for notification of the value information of a DTMF signal (DTMF code information). That is to say, the DTMF cell class domain F504a notifies that this DTMF cell is a DTMF ON/OFF cell for sending out a signal to send or stop a DTMF signal, or a silence cell for showing sending of a silence signal, or a silence canceling cell for showing stop of sending a silence signal. And the DTMF code domain F504b notifies one of "0" to "9", "*", "#", and "A" to "D" each of which is a DTMF code of a DTMF signal.

A silence cell, a silence canceling cell and a DTMF ON/OFF cell are described in detail later.

In FIG. 1, there is a case that an extension telephone 44 accommodated in the PBX 4 accesses the electronic mail apparatus 58 accommodated in the PBX 5, and a speech connection is performed through the PBX 4, the ATM multiplexer 1, the ATM network 3, the ATM multiplexer 2 and the PBX 5, and a PB signal which is one of DTMF signals is sent out from the extension telephone 44, and the electronic mail apparatus 58 is controlled.

Taking as an example such a case as this, a DTMF signal transmission method for transmitting a DTMF signal from the PBX 4 side to the PBX 5 side is described in the following.

Figure 6:
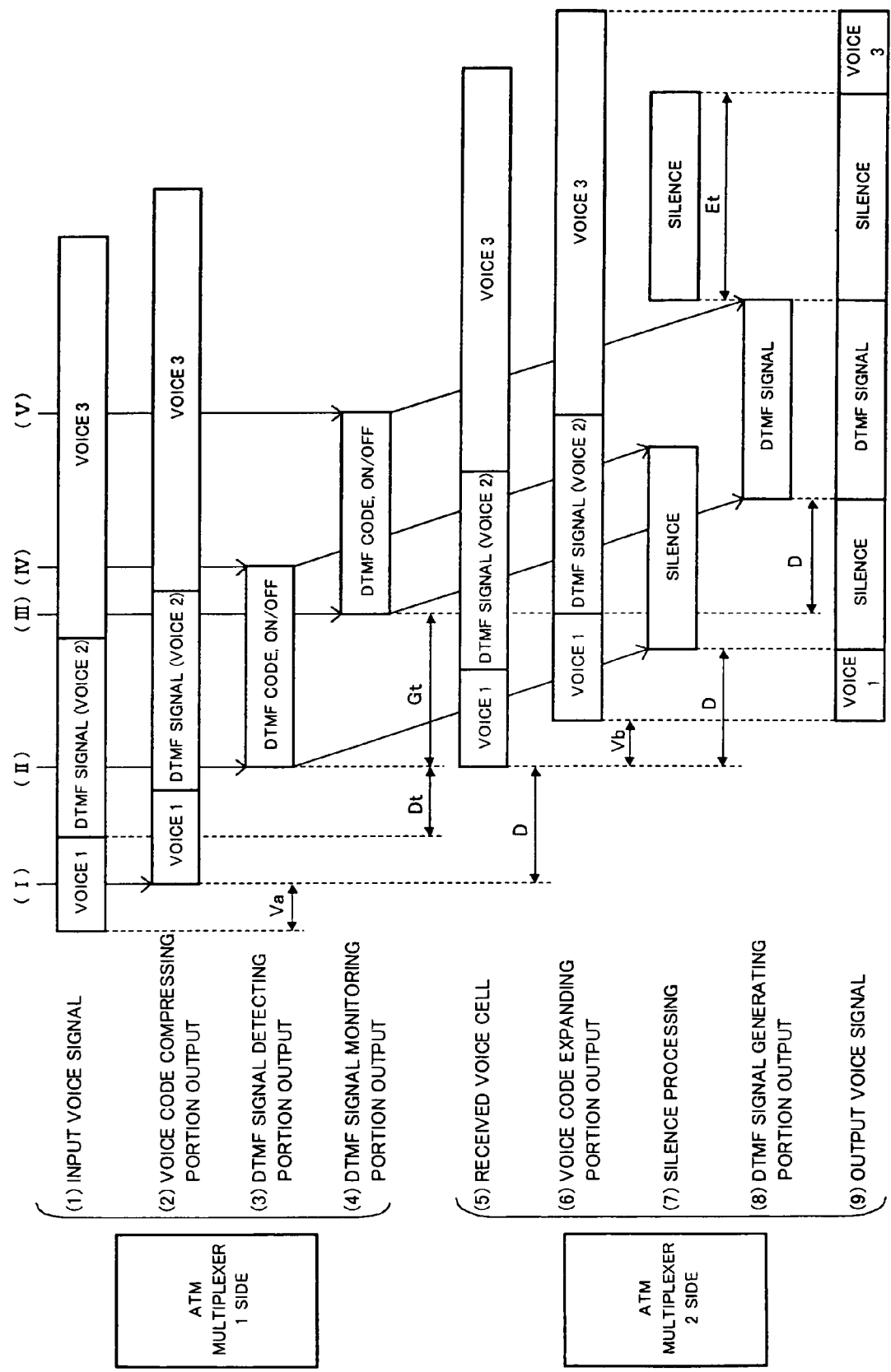
FIG. 6 is an operation sequence diagram for explaining a first embodiment in relation to operation of a DTMF transmission method of the present invention.

FIG. 6 is an operation sequence diagram for explaining a first embodiment in relation to operation of a DTMF transmission method of the present invention.

In FIGS. 2 and 6, when a voice signal is inputted from an extension telephone 44 into the ATM multiplexer 1 through the trunk 42 of the PBX 4, the ATM multiplexer 1 inputs the voice signal as an input voice signal (1) through the trunk circuit interface portion 101 into the voice code compressing portion 104 and the DTMF signal detecting portion 102.

In this embodiment, as an example a case is explained that the input voice signal (1) is sent out in order of "voice 1", "DTMF signal (voice 2)" and "voice 3" as shown in FIG. 6.

The voice code compressing portion 104 voice-code-compresses as a voice signal any of "voice 1", "DTMF signal (voice 2)" and "voice 3". Therefore, since the DTMF signal (voice 2) is also processed as a voice signal, a voice-code-compressed voice signal (2) is sent out from the voice code compressing portion 104 to the voice cell generating portion 106, as shown in FIG. 6. Hereupon, it is assumed that the voice code compressing portion 104 needs a processing time Va for a voice code compression process.

The voice cell generating portion 106 produces one after another CPS-PDU Payloads for a voice cell shown in FIG. 4(a) from the voice-code-compressed voice signal (2), and generates a voice cell by adding an ATM header and an STF to them and sends out the voice cell to the cell multiplexing portion 107.

On the other hand, the DTMF signal detecting portion 102 receives a voice signal (input voice signal (1)) and always monitors the content of the voice signal. And it judges a DTMF signal on the basis of a judgement time Dt required for a DTMF judgement, and when it has received a DTMF signal (voice 2), it brings a first DTMF detection signal into an ON state and outputs it.

When recognizing that the first DTMF detection signal outputted from the DTMF signal detecting portion 102 is in an ON state, the DTMF cell generating portion 105 produces a CPS-PDU Payload for a DTMF cell shown in FIG. 4(b), stores the code of a silence cell into the DTMF cell class domain F504a of the DTMF CODE domain F504, generates a DTMF cell by adding an ATM header and an STF to this, and sends out this DTMF cell to the cell multiplexing portion 107.

And the DTMF signal monitoring portion 103 samples a first DTMF detection signal from the DTMF signal detecting portion 102 at intervals of 1 ms for example and detects a change point of ON/OFF states of the first DTMF detection signal, and when a state change is detected (when the state is changed from an ON state to an OFF state, or when the state is changed from an OFF state to an ON state), it requests the DTMF cell generating portion 105 to send out a DTMF cell. The DTMF signal monitoring portion 103 has a DTMF guard function set on it, and in case that an ON state is not kept for a time not shorter than a predefined guard time Gt, it performs a process in which it is not consider that the first DTMF detection signal has changed from an OFF state to an ON state.

Therefore, in case that the DTMF signal detecting portion 102 has detected a DTMF signal (voice 2) as shown in FIG. 6 and continues outputting an ON state of a first DTMF detection signal for a time not shorter than a guard time Gt, the DTMF signal monitoring portion 103 outputs a second DTMF detection signal being in an ON state. And at the same time, the DTMF signal monitoring portion 103 notifies the DTMF cell generating portion 105 of value information of a DTMF signal (DTMF code information) and a signal change detection time obtained by adding a guard time Gt to a time from a point of time of detecting the DTMF signal (a point of time when a second DTMF detection signal has come into an ON state) to a point of time when a first DTMF detection signal from the DTMF signal detecting portion 102 has changed from an ON state to an OFF state.

A guard time Gt is set (stored) in a flash ROM provided in the DTMF signal monitoring portion 103 and can be properly set by the management terminal apparatus 8 or the centralized management terminal apparatus 7, but a detailed explanation for this setting is described later.

When the DTMF cell generating portion 105 recognizes that a second DTMF detection signal from the DTMF signal monitoring portion 103 has changed into an ON state and receives a signal change detection time and value information of a DTMF signal (DTMF code information) from the DTMF signal monitoring portion 103, it generates a CPS-PDU Payload for a DTMF cell shown in FIG. 4(b) and stores the signal change detection time into the DTMF TIME domain F502, "1" which means there is a DTMF signal into the DV domain, a code representing a DTMF ON/OFF cell into the DTMF cell class domain F504a of the DTMF CODE domain 504, and a DTMF code showing the value of a received DTMF signal into the DTMF code domain F504b, and generates a DTMF cell (hereinafter referred to as a "DTMF ON cell") by adding an ATM header and an STF to them, and sends out this DTMF cell to the cell multiplexing portion 107.

And when the DTMF signal detecting portion 102 recognizes that a DTMF signal is not detected and changes a first DTMF detection signal from an ON state to an OFF state and the DTMF cell generating portion 105 detects that the first DTMF detection signal has changed into an OFF state, the DTMF cell generating portion 105 generates a CPS-PDU Payload for a DTMF cell shown in FIG. 4(b) and stores the code of a silence canceling cell into the DTMF cell class domain F504a of the DTMF CODE domain F504 shown in FIG. 5, and generates a DTMF cell by adding an ATM header and an STF to them (hereinafter referred to as a "silence canceling cell") and sends out this DTMF cell to the cell multiplexing portion 107.

Furthermore, when the DTMF signal monitoring portion 103 recognizes that a DTMF signal is not detected and changes a second DTMF detection signal from an ON state to an OFF state and the DTMF cell generating portion 105 detects that the second DTMF detection signal has changed into an OFF state, the DTMF cell generating portion 105 generates a CPS-PDU Payload for a DTMF cell shown in FIG. 4(b) and stores "0" which means that there is not a DTMF signal into the DV domain shown in FIG. 5 and a code representing a DTMF ON/OFF cell into the DTMF cell class domain F504*a* of the DTMF CODE domain 504, and generates a DTMF cell by adding an ATM header and an STF to them (hereinafter referred to as a "DTMF OFF cell") and sends out this DTMF OFF cell to the cell multiplexing portion 107.

The cell multiplexing portion 107 transmits ATM cells (DTMF cells or voice cells) generated by the DTMF cell generating portion 105 or the voice cell generating portion 106 in order of cell transmission requests through the ATM network interface portion 108 and the ATM network 3 to the opposite ATM multiplexer 2. In case that the DTMF cell generating portion 105 and the voice cell generating portion 106 have issued cell transmission requests at the same time, a DTMF cell from the DTMF cell generating portion 105 is processed with priority. As a result, therefore, the ATM multiplexer 1 sends out voice cells successively from a point of time (I) of FIG. 6, and sends out a silence cell at a point of time (II) during the transmission, a DTMF ON cell at a point of time (III), a silence canceling cell at a point of time (IV), and a DTMF OFF cell at a point of time (V).

Next, operation of the ATM multiplexer 2 at the ATM cell reception side is described.

The ATM multiplexer 2 receives an ATM cell (voice cell or DTMF cell) after the lapse of a transmission delay time D caused by a transit trunk and the like.

When the cell demultiplexing portion 209 receives an ATM cell through the ATM network interface portion 208, it reads information stored in the VF domain in the CPS-PH portion F401 of the ATM cell as shown in FIG. 4(*a*) or (*b*), judges whether the received ATM cell is a voice cell or a DTMF cell, sends out this received ATM cell to the voice decomposing portion 211 in case that it is a voice cell, and sends out this received ATM cell to the DTMF cell decomposing portion 210 in case that it is a DTMF cell.

When the voice cell decomposing portion 211 receives a voice cell (received voice cell (5)), it performs an ATM header process, a CPS-PH process and the like, and extracts and sends out a voice-code-compressed voice signal to the voice code expanding portion 214.

When the voice code expanding portion 214 receives a voice-code-compressed voice signal, it decodes/expands and transmits this voice signal to the selector (a) 216 as a voice code expanding portion output (6). Hereupon, it takes a decoding process time Vb for decoding/expanding.

On the other hand, when the DTMF cell decomposing portion 210 receives a DTMF cell transmitted at the point of time (II) in FIG. 6 and recognizes that it is a silence cell, the DTMF cell decomposing portion 210 directs the output information switching portion 212 to switch over the selector (a) 216. Namely, the output information switching portion 212 recognizes that a silence cell has arrived and switches over the selector (a) 216 so that the output of the selector (a) 216 is a silence cell sent out from the silence generating portion 215.

Next, when the DTMF cell decomposing portion 210 receives a DTMF cell transmitted at the point of time (III) in FIG. 6 and recognizes that it is a DTMF ON cell, the DTMF cell decomposing portion 210 directs the output information switching portion 212 to switch over the selector (b) 217. Namely, the output information switching portion 212 recognizes that a DTMF ON cell has arrived and switches over the selector (b) 217 so that the output of the selector (b) 217 is a DTMF signal sent out from the DTMF signal generating portion 213.

And at the same time as this, the DTMF cell decomposing portion 210 notifies the DTMF signal generating portion 213 of a signal change detection time and value information of a DTMF signal (DTMF code information) contained in the received DTMF ON cell, and directs the DTMF signal generating portion 213 to generate a DTMF code corresponding to these information contents and send out the DTMF code as a DTMF signal generating portion output (7). At this time, therefore, the selector (b) 217 reproduces and outputs a DTMF signal corresponding to the signal change detection time and value information of a DTMF signal (DTMF code information) contained in the received DTMF ON cell.

Next, when the DTMF cell decomposing portion 210 receives a DTMF cell transmitted at the point of time (IV) in FIG. 6 and recognizes that it is a silence canceling cell, the DTMF cell decomposing portion 210 directs the output information switching portion 212 to switch over the selector (a) 216. Namely, the output information switching portion 212 recognizes that a silence canceling cell has arrived and switches over the selector (a) 216 so that the output of the selector (a) 216 is a voice signal outputted from the voice code expanding portion 214.

And when the DTMF cell decomposing portion 210 receives a DTMF cell transmitted at the point of time (V) in FIG. 6 and recognizes that it is a DTMF OFF cell, the DTMF cell decomposing portion 210 directs the output information switching portion 212 to switch over the selector (a) 216 and the selector (b) 217. Namely, the output information switching portion 212 recognizes that a DTMF OFF cell has arrived and controls the selector (a) 216 and the selector (b) 217 so that the output of the selector (a) 216 is a silence signal outputted from the silence generating portion 215 and the output of the selector (b) 217 is the output from the selector (a) 216 and thereby a silence signal is outputted from the selector (b) 217. And the output information switching portion 212 counts by a timer that a silence signal has been sent out for a fixed time Et from the selector (b) 217 and then switches over the selector (a) and switches over the selector (b) 217 so that the output from the selector (b) 217 becomes the output from the selector (a) 216 (voice signal output from the voice code expanding portion 214).

The fixed time Et is used for preventing an echo caused by circular cross talk of a DTMF signal sent out by the DTMF signal generating portion 213.

As a result of the above-mentioned operation, the output from the selector (b) 217 becomes an output voice signal (9) shown in FIG. 6 and this output voice signal is transmitted through the trunk circuit interface portion 201 to the PBX. Accordingly, a voice-code-compressed/expanded DTMF signal is not inputted into a voice terminal apparatus of a PBX and the like but can be exactly transmitted.

Next, a composition and a method for setting a guard time Gt on the DTMF signal monitoring portion 103 are described.

Figure 8:
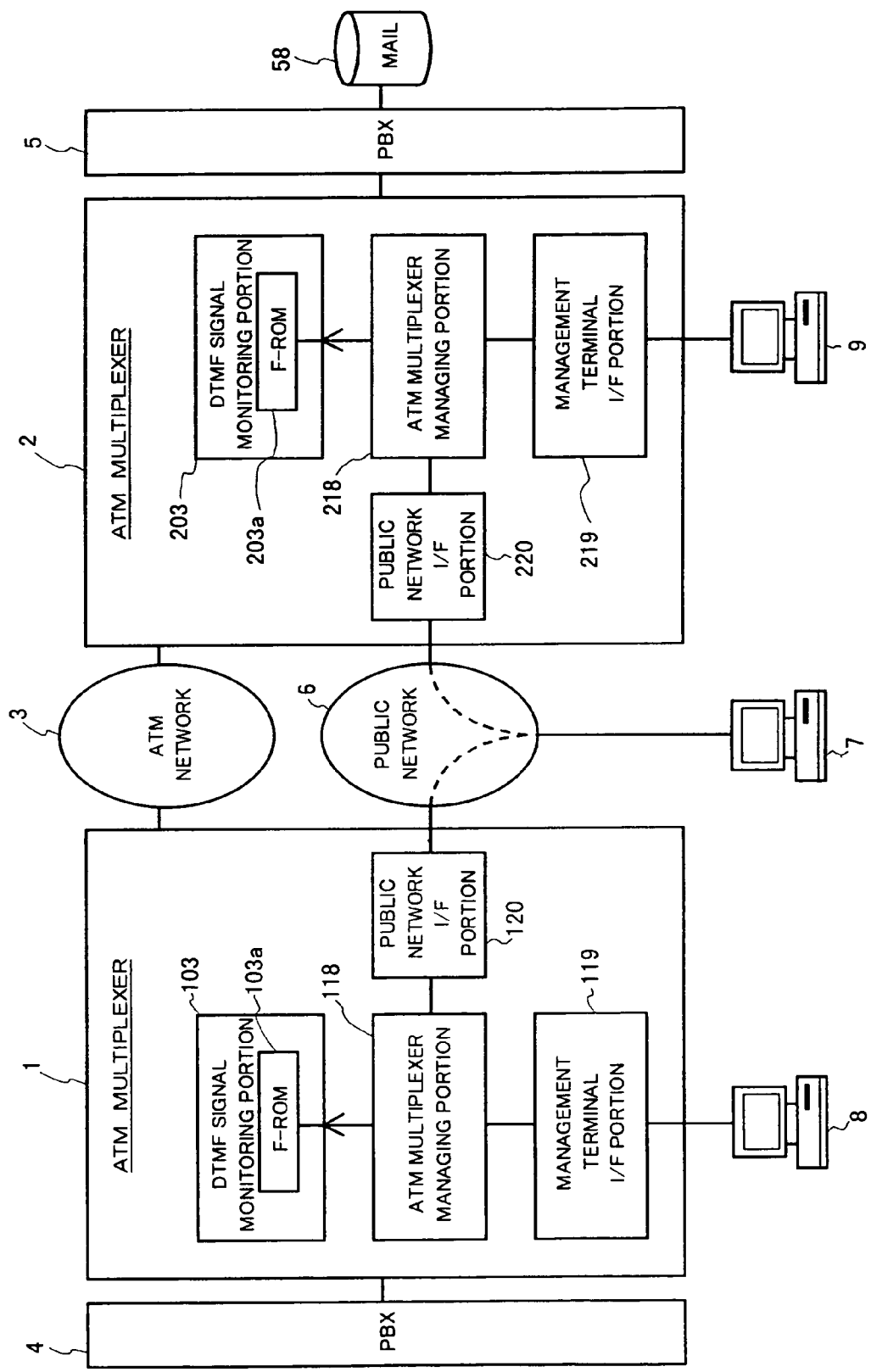
FIG. 8 is a diagram showing the composition of a system and ATM multiplexer making it possible to optionally set a guard time of a DTMF signal monitoring portion.

FIG. 8 is a diagram showing the composition of a system and ATM multiplexer for making it possible to optionally set a guard time Gt.

In FIG. 8, the ATM multiplexer 1 is provided with a DTMF signal monitoring portion 103 as described above, and this DTMF signal monitoring portion 103 is provided with a flash ROM (F-ROM) 103*a* for storing a guard time Gt in it.

In addition to this, the ATM multiplexer 1 is provided with an ATM multiplexer managing portion 118, a management terminal interface portion 119 for acting an interface with the management terminal apparatus 8 and a public network interface portion 120 for acting an interface with a public network 6 such as ISDN and the like.

The ATM multiplexer managing portion 118, which has a function of writing (or rewriting) contents (data) into the flash ROM 103*a* in the ATM signal monitoring portion 103, operates according to a setting operation from the management terminal apparatus 8 connected to the management terminal interface portion 119 or the centralized management terminal apparatus 7 connected through a public network 6 to the public network interface portion 120. Namely, the ATM multiplexer 1 makes it possible to set a guard time Gt being the most suitable for the whole system configuration into the flash ROM 103a by manually operating the centralized management terminal apparatus 7 or the management terminal apparatus 8.

And in the same way as the ATM multiplexer 1, the ATM multiplexer 2 is provided with a DTMF signal monitoring portion 203, being provided with a flash ROM (F-ROM) 203a for storing a guard time Gt in it, an ATM multiplexer managing portion 218, a management terminal interface portion 219 for acting as an interface with a management terminal apparatus 9 and a public network interface portion 220 for acting as an interface with a public network 6 such as ISDN and the like and thereby makes it possible to set (store) a guard time Gt being the most suitable for the whole system configuration into the flash ROM 203a.

This embodiment is composed so that either one of 30 ms (milliseconds), 40 ms, 50 ms, 60 ms, 80 ms, 100 ms, 120 ms, 150 ms, 180 ms, 200 ms and 250 ms can be selectively set. In such a way, by making it possible to properly set a guard time Gt, it is possible to adapt the system to various communication standards, and in case of a communication standard in which the transmission and reception time of a DTMF signal should be not less than 45 ms, it is possible to adapt the system to this communication standard by setting a guard time Gt at 40 ms in consideration of a delay time necessary for processing.

And in case of guaranteeing, for example, 100 ms or more as a DTMF signal transmission time of a voice terminal to be connected, it is possible to set a guard time Gt at a long time of 100 ms or so, and therefore even in case that a voice input signal (for example a natural voice input) contains a frequency component of a DTMF signal or a frequency component approximate to a frequency component of a DTMF signal, the probability of erroneously detecting this voice signal as a DTMF signal is very small and thus it is possible to improve the system operation in reliability.

In addition, since this guard time Gt can be set by the centralized management terminal apparatus 7 installed at a remote site, its value can be easily changed even after the system comes into an operation state and even in case that a phenomenon of erroneously detecting an input voice signal as a DTMF signal occurs, it is possible to prevent the phenomenon of erroneously detecting an input voice signal as a DTMF signal by quickly changing the value of a guard time Gt to a larger value using the centralized management terminal apparatus 7 at the remote site, and therefore the serviceability is improved.

The guard time Gt can be also used by changing over between a value used in a call connection (basic value) and a value used in talking. Therefore, in a communication standard in which the transmission and reception time of a DTMF signal is prescribed to be not less than 45 ms in order to quickly perform a call connection, the guard time Gt in a call connection can be set at 40 ms so that the transmission time of a DTMF signal is not less than 45 ms and the guard time is the shortest time adaptive to this communication standard, and the guard time Gt in talking can be set at a larger value of 100 ms in order to prevent detecting erroneously a voice signal as a DTMF signal.

Furthermore, in the DTMF signal monitoring portion 103, in case that a guard time Gt is not set in the flash ROM 103a or in case of a call connection, the system can be composed so as to fixedly use as a guard time Gt the smallest value (for example 40 ms) of the transmission and reception time of a DTMF signal being conformable to a communication standard, and by doing so, a system setting operation can be efficiently performed from the centralized management terminal apparatus 7 or the management terminal apparatus 8.

Next, operation of a second embodiment in case that a DTMF guard function is not set in the DTMF signal monitoring portion 103 of the ATM multiplexer 1 is described.

Figure 7:
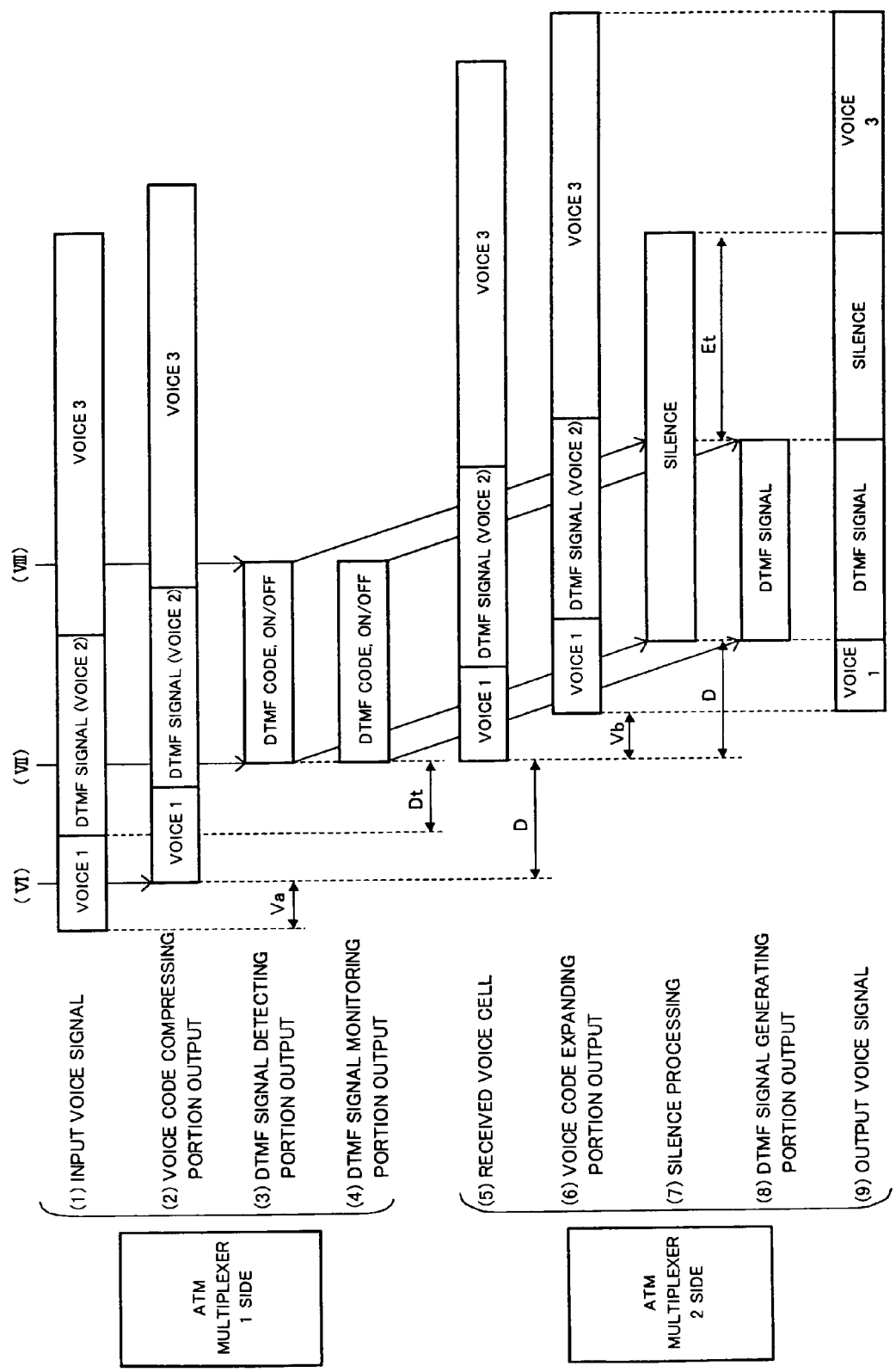
FIG. 7 is an operation sequence diagram for explaining a second embodiment in relation to operation of a DTMF transmission method of the present invention.

FIG. 7 is an operation sequence diagram for explaining a second embodiment in relation to operation of a DTMF transmission method of the present invention.

In FIGS. 2 and 7, the voice code compressing portion 104 voice-code-compresses as a voice signal any of "voice 1", "DTMF signal (voice 2)" and "voice 3", and as shown in FIG. 7, a voice-code-compressed voice signal (2) is sent out from the voice code compressing portion 104 to the voice cell generating portion 106. Hereupon, it is assumed that the voice code compressing portion 104 needs a processing time Va for a voice code compression process.

The DTMF signal detecting portion 102 receives a voice signal (input voice signal (1)) and always monitors the content of the signal. And it judges a DTMF signal on the basis of a judgement time Dt required for a DTMF judgement, and when it has received a DTMF signal (voice 2), it brings a first DTMF detection signal into an ON state.

On the other hand, when recognizing that the first DTMF detection signal outputted from the DTMF signal detecting portion 102 has changed into an ON state, the DTMF cell generating portion 105 generates and sends out a silence cell to the cell multiplexing portion 107.

And since, when the DTMF signal detecting portion 102 has detected a DTMF signal (voice 2), the DTMF signal monitoring portion 103 also detects the DTMF signal (voice 2) approximately at the same time, the DTMF signal monitoring portion 103 changes a second DTMF detection signal from an ON state to an OFF state and notifies the DTMF cell generating portion 105 of a signal change detection time and value information of DTMF (DTMF code information).

When the DTMF cell generating portion 105 recognizes that a second DTMF detection signal from the DTMF signal monitoring portion 103 has changed into an ON state and receives a signal change detection time and value information of a DTMF signal (DTMF code information) from the DTMF signal monitoring portion 103, it generates a DTMF ON cell, as shown in FIG. 5, which has the signal change detection time stored in the DTMF TIME domain F502, "1" which means there is a DTMF signal stored in the DV domain, a code representing the value of a DTMF ON/OFF cell stored in the DTMF cell class domain F504a of the DTMF CODE domain 504, and a code representing the value of a received DTMF signal stored in the DTMF code domain F504b, and sends out this DTMF ON cell to the cell multiplexing portion 107.

And when the DTMF signal detecting portion 102 recognizes that a DTMF signal is not detected and changes a first DTMF detection signal from an ON state to an OFF state and the DTMF cell generating portion 105 detects that the first DTMF detection signal has been in an OFF state, it generates a silence canceling cell and sends out this silence canceling cell to the cell multiplexing portion 107.

Furthermore, when the DTMF signal monitoring portion 103 recognizes that a DTMF signal is not detected and changes a second DTMF detection signal from an ON state to an OFF state and the DTMF cell generating portion 105 detects that the second DTMF detection signal has been in an OFF state, it generates a DTMF OFF cell and sends out this DTMF OFF cell to the cell multiplexing portion 107.

The cell multiplexing portion 107 transmits ATM cells (DTMF cells or voice cells) generated by the DTMF cell generating portion 105 or the voice cell generating portion 106 in order of cell transmission requests through the ATM network interface portion 108 and the ATM network 3 to the opposite ATM multiplexer 2. In case that the DTMF cell generating portion 105 and the voice cell generating portion 106 have issued cell transmission requests at the same time, a DTMF cell from the DTMF cell generating portion 105 is processed with priority. As a result, therefore, the ATM multiplexer 1 sends out voice cells successively from a point of time (VI) of FIG. 7, and sends out a silence cell and a DTMF ON cell at a point of time (VII) during the transmission, and a silence canceling cell and a DTMF OFF cell at a point of time (VIII).

Next, operation of the ATM multiplexer 2 at the ATM cell receiving side is described.

The ATM multiplexer 2 receives an ATM cell (voice cell or DTMF cell) after the lapse of a transmission delay time D caused by a transit trunk and the like.

When the cell demultiplexing portion 209 receives an ATM cell through the ATM network interface portion 208, it judges whether the received ATM cell is a voice cell or a DTMF cell, sends out this received ATM cell to the voice decomposing portion 211 in case that it is a voice cell, and sends out this received ATM cell to the DTMF cell decomposing portion 210 in case that it is a DTMF cell.

When the voice cell decomposing portion 211 receives a voice cell (received voice cell (5)), it performs an ATM header process, a CPS-PH process and the like, and extracts and sends out a voice-code-compressed voice signal to the voice code expanding portion 214.

When the voice code expanding portion 214 receives a voice-code-compressed voice signal, the voice code expanding portion 214 decodes and transmits it to the selector (a) 216 as a voice code expanding portion output (6). Hereupon, it takes a decoding process time Vb for decoding.

On the other hand, when the DTMF cell decomposing portion 210 recognizes a silence cell and a DTMF ON cell transmitted at the point of time (VII) in FIG. 7, the DTMF cell decomposing portion 210 directs the output information switching portion 212 to switch over the selector (a) 216 and selector (b) 217 so that the output of the selector (a) 216 is a silence signal outputted from the silence generating portion 215 and the output of the selector (b) 217 is a DTMF signal outputted from the DTMF signal generating portion 213.

And at the same time as this, the DTMF cell decomposing portion 210 notifies the DTMF signal generating portion 213 of a signal change detection time and value information of a DTMF signal (DTMF code information) contained in the received DTMF ON cell, and directs the DTMF signal generating portion 213 to generate and send out a DTMF code corresponding to these information contents as a DTMF signal generating portion output (7). At this time, therefore, the selector (b) 217 outputs a DTMF signal corresponding to the signal change detection time and value information of a DTMF signal (DTMF code information) contained in the received DTMF ON cell.

Next, when the DTMF cell decomposing portion 210 recognizes a silence canceling cell and a DTMF OFF cell transmitted at the point of time (VIII) in FIG. 7, the DTMF cell decomposing portion 210 directs the output information switching portion 212 to switch over the selector (b) 217 so that the output of the selector (b) 217 is the output from the selector (a) 216 and a silence signal is sent out from the selector (b) 217.

And the output information switching portion 212 counts by a timer that a fixed time Et has elapsed after recognizing reception of a DTMF OFF cell, and then switches over the selector (a) and switches over the selector (b) 217 so that the output from the selector (b) 217 becomes the output from the selector (a) 216 (voice signal output from the voice code expanding portion 214).

As a result of the above-mentioned operation, the output from the selector (b) 217 becomes an output voice signal (9) shown in FIG. 7 and this output voice signal is transmitted through the trunk circuit interface portion 201 to the PBX. Accordingly, a voice-code-compressed/expanded DTMF signal is not inputted into a voice terminal apparatus of a PBX and the like but can be exactly transmitted in a short time.

In such a way, not only a voice signal but also a DTMF signal can be exactly transmitted from an extension telephone 44 of the PBX 4 to the voice mail apparatus 58.

As described above, the DTMF signal monitoring portion 103 or 203 has a function of notifying the DTMF cell generating portion 105 or 205 of the DTMF signal status information showing a state where a DTMF signal is periodically detected at intervals of a predetermined time (for example, intervals of one second) or a state where it is not detected. And the DTMF cell generating portion 105 or 205 sends out a DTMF ON cell or a DTMF OFF cell on the basis of this notification.

Since this embodiment is composed so that after the ATM multiplexer which has received a DTMF ON cell sends out a DTMF signal it receives a DTMF OFF cell and then stops a DTMF signal, this function is necessary. That is to say, this function prevents a state that a DTMF OFF cell is lost in the ATM network due to a failure or an erroneous operation of the ATM network and therefore the ATM multiplexer cannot receive the DTMF OFF cell and continues to send out a DTMF signal.

According to the present invention, in a communication system using a voice code compression, by encoding and transmitting a DTMF signal and processing a DTMF signal to be transmitted as a voice signal into a silence signal, it is possible to reproduce the DTMF signal within a prescribed value and transmit the DTMF signal without error.

Accordingly, even in case of connecting voice terminal apparatuses of PBXs and the like to each other by means of communication apparatuses having a voice code compression function such as ATM multiplexers, it is possible to use value-added communication services such as an operation service of a voice mail apparatus by means of DTMF signals as well as a mail forwarding service, a voice guidance service and the like.

And adding a DTMF guard function to a DTMF signal monitoring portion brings an effect of reducing a frequency at which an input voice signal is erroneously detected as a DTMF signal.

What is claimed is:

1. A communication apparatus connected to a communication channel, comprising:
 a voice coding unit for code-compressing a voice signal inputted and thereby generating voice information,
 a DTMF detecting unit for detecting a DTMF signal from said voice signal,
 a DTMF coding unit for, when this DTMF detecting unit has detected a DTMF signal, coding this DTMF signal into a specified form and thereby generating DTMF information, and an information outputting unit for outputting the voice information generated by said voice coding unit and/or the DTMF information generated by said DTMF coding unit to said communication channel, wherein:

said DTMF information has a header portion indicating destination information and a payload portion containing DTMF code information indicating the code of said DTMF signal and signal detecting time information indicating the time of detecting this DTMF signal.

2. A communication apparatus according to claim 1, wherein:

said DTMF detecting unit has a measuring unit for measuring the signal detecting time of said DTMF signal and an analyzing unit for analyzing the code of said DTMF signal, and said DTMF coding unit, when said DTMF signal has been detected continuously for a predetermined time or longer, generates said signal detecting time information on the basis of the result of measurement of said measuring unit, generates said DTMF code information on the basis of the result of analysis of said analyzing unit, and generates said DTMF information including these signal detecting time information and DTMF code information.

3. A communication apparatus connected to a communication channel, comprising:

a voice decoding unit for generating a voice signal by decoding code-compressed voice information contained in received information received from said communication channel, a DTMF information detecting unit for detecting that said received information is DTMF information, a DTMF decoding unit for, when this DTMF information detecting unit has detected DTMF information, decoding this DTMF information and thereby generating the content of DTMF, a DTMF signal generating unit for generating a DTMF signal on the basis of the content of DTMF generated by this DTMF decoding unit, and a voice outputting unit for outputting a voice signal generated by said voice decoding unit or a DTMF signal generated by said DTMF signal generating unit, wherein:

said DTMF information has a header portion indicating destination information and a payload portion containing DTMF code information indicating the code of said DTMF signal and signal detecting time information indicating the signal detecting time of this DTMF signal.

4. A communication apparatus according to claim 3, wherein:

said DTMF decoding unit decodes said DTMF information and generates the content of DTMF including said DTMF code information and signal detecting time information, and said DTMF signal generating unit generates said DTMF signal on the basis of DTMF code information and signal detecting time information of the content of DTMF generated by said DTMF decoding unit.

5. A communication apparatus comprising:

a voice coding unit for code-compressing a voice signal inputted and thereby generating voice information, a DTMF detecting unit for detecting a DTMF signal from said voice signal, a DTMF coding unit for, when the DTMF detecting unit has detected a DTMF signal, coding the DTMF signal into a specified form and thereby generating DTMF information, an information outputting unit for outputting the voice information generated by said voice coding unit or the DTMF information generated by said DTMF coding unit to a communication channel, and a DTMF signal termination notifying unit for transmitting information indicative of termination of sending the DTMF signal from the DTMF coding unit to the communication channel, together with the DTMF information.

6. A communication apparatus comprising:

a voice decoding unit for generating a voice signal by decoding code-compressed voice information contained in received information received from a communication channel, a DTMF information detecting unit for detecting that said received information is DTMF information, a DTMF decoding unit for, when the DTMF information detecting unit has detected DTMF information, decoding the DTMF information and thereby generating the content of DTMF, a DTMF signal generating unit for generating a DTMF signal on the basis of the content of DTMF generated by this DTMF decoding unit, a voice outputting unit for outputting a voice signal generated by said voice decoding unit or a DTMF signal generated by said DTMF signal generating unit, and a silence signal generating unit for generating a silence signal or a noise signal before or after sending the DTMF signal transmitted by the voice output unit and thereby sending the generated silence signal or noise signal to a voice terminal apparatus.

7. A communication apparatus according to claim 6, wherein:

said DTMF decoding unit decodes said DTMF information and generates the content of DTMF including said DTMF code information and signal detecting time information, and said DTMF signal generating unit generates said DTMF signal on the basis of DTMF code information and signal detecting time information of the content of DTMF generated by said DTMF decoding unit.

8. A communication apparatus comprising:

a voice coding unit for code-compressing a voice signal inputted and thereby generating voice information, a DTMF detecting unit for detecting a DTMF signal from said voice signal, a DTMF coding unit for, when the DTMF detecting unit has detected a DTMF signal, coding the DTMF signal into a specified form and thereby generating DTMF information, an information outputting unit for outputting the voice information generated by said voice coding unit or the DTMF information generated by said DTMF coding unit to a communication channel, a DTMF signal termination notifying unit for transmitting information indicative of termination of the DTMF signal sent from the DTMF coding unit to the communication channel together with the DTMF information, a voice decoding unit for generating a voice signal by decoding code-compressed voice information contained in received information received from the communication channel, a DTMF information detecting unit for detecting that said received information is DTMF information, a DTMF decoding unit for, when the DTMF information detecting unit has detected DTMF information, decoding the DTMF information and thereby generating the content of DTMF, a DTMF signal generating unit for generating a DTMF signal on the basis of the content of DTMF generated by this DTMF decoding unit, a voice outputting unit for outputting a voice signal generated by said voice decoding unit or a DTMF signal generated by said DTMF signal generating unit, and a silence signal generating unit for generating a silence signal or a noise signal before or after transmittance of the DTMF signal sent by the voice output unit, when information indicative of termination of the DTMF signal is detected by the DTMF signal termination notifying unit, and thereby sending the silence signal or the noise signal to a voice terminal apparatus together with the DTMF information detected by the DTMF information detecting unit.

* * * * *